United States Patent
Jennings et al.

[11] Patent Number: 6,070,998
[45] Date of Patent: Jun. 6, 2000

[54] FIBER OPTIC LIGHTING SYSTEM FOR VEHICLE DOOR HANDLE

[75] Inventors: Kurt Lynn Jennings; Neil Duane Wolfe, both of Warren, Ohio

[73] Assignee: General Motors Corporation, Detroit, Mich.

[21] Appl. No.: 09/012,317

[22] Filed: Jan. 23, 1998

[51] Int. Cl.[7] .................................................. B60Q 1/00
[52] U.S. Cl. ...................... 362/501; 362/551; 362/100; 362/399; 362/400
[58] Field of Search ................................. 362/501, 551, 362/100; 292/336.3; 296/146.1; 49/460

[56] References Cited

U.S. PATENT DOCUMENTS

| | | | |
|---|---|---|---|
| 3,423,581 | 1/1969 | Baer | 362/551 |
| 3,908,149 | 9/1975 | Gergoe et al. | 315/84 |
| 3,916,250 | 10/1975 | Brock et al. | 315/84 |
| 4,041,301 | 8/1977 | Pelchat | 240/2.13 |
| 4,467,402 | 8/1984 | Bauer et al. | 362/32 |
| 4,688,353 | 8/1987 | Almen | 49/460 |
| 4,956,943 | 9/1990 | Yamada et al. | 49/460 |
| 5,144,538 | 9/1992 | Harris | 362/80 |
| 5,297,010 | 3/1994 | Camarota et al. | 362/80 |
| 5,497,306 | 3/1996 | Pastrick | 362/83.1 |
| 5,669,704 | 9/1997 | Pastrick | 362/83.1 |
| 5,709,453 | 1/1998 | Krent et al. | 362/80 |

*Primary Examiner*—Sandra O'Shea
*Assistant Examiner*—John A. Ward
*Attorney, Agent, or Firm*—Patrick M. Griffin

[57] ABSTRACT

Disclosed is a fiber optic light positioned to illuminate the exterior door wall in the area of the door handle. The fiber optic line is preferably carried in the door handle and positioned to produce a flood of light reflecting off of the door wall and in particularly off of the bezel behind the door handle. The fiber optic line may also be positioned in the door wall or bezel to produce light reflecting off the door wall or bezel. The door wall or bezel may include a lip or eyebrow structure over hanging the end of the fiber optic line so that the end of the fiber optic line (and the direct light source) is not visible to a person standing next to the door in an upright position.

7 Claims, 3 Drawing Sheets

FIBER OPTIC LIGHTING SYSTEM FOR VEHICLE DOOR HANDLE

TECHNICAL FIELD

This invention relates to a lighting system for the exterior door handle of a vehicle such as a car or truck.

BACKGROUND OF THE INVENTION

The prior art includes lighting systems on the exterior of a vehicle using LED's or very well packaged incandescent light bulbs. However, the harsh environment conditions related to the exterior of the vehicle make the use of these systems expensive and often problematic.

The present invention provides advantages and alternatives over the prior art.

SUMMARY OF THE INVENTION

The invention includes the use of a fiber optic light system to provide illuminated entry systems in the area of the exterior door handle of a vehicle such as a car or truck. This may include door-mounted courtesy lights, and ground illumination (puddle) lights, exterior door handle and underbody lights, various decorative courtesy light and key lock lights.

More particularly, the invention includes a fiber optic light positioned to illuminate the exterior door wall in the area of the door handle. The fiber optic light is preferably carried in the door handle and positioned to produce a flood of light reflecting off of the door wall and in particular off of the bezel behind the door handle. The fiber optic light may also be positioned in the door wall or bezel to produce light reflecting off the door wall or bezel. The door wall or bezel may include a lip or eyebrow structure over hanging the end of the fiber optic line so that the end of the fiber optic line (and the direct light source) is not visible to a person standing next to the door in an upright position.

These and other objects, features and advantage will be apparent from the following brief description of the drawings, detailed description and appended claims and drawings.

DESCRIPTION OF THE PREFERRED EMBODIMENT

According to the present invention, a fiber optic light can be integrated into the grab handle or be integral to the bezel unit surrounding the grab hand of the exterior door of a vehicle. An incandescent lighting feature in this area is not used in a commercial capacity today due to difficult packaging constraints that will not allow for cost effective integration of traditional lighting technology without long term reliability problems.

When a fiber optic light system according to the present invention is integrated into the door handle the result is a hidden light source that creates a well of light behind the handle. When the fiber optic light is integrated into the bezel unit then the preference is to have a horizontal edge or eyebrow over hanging the end of the fiber optic line so that the light source is not seen by a person standing in an upright position next to the door, but a flood light from the fiber optic line is resultant in the door handle well. The integration of the fiber optic line into the handle can be accomplished using a transmission line that extends into the handle so that the light is directed against the door wall, door well or bezel. The use of a fiber optic transmission line in this location, as opposed to a filament based light bulb, provides a small, flexible packing capability, moisture and vibration resistant componentry with heat free light output.

Figure 1:
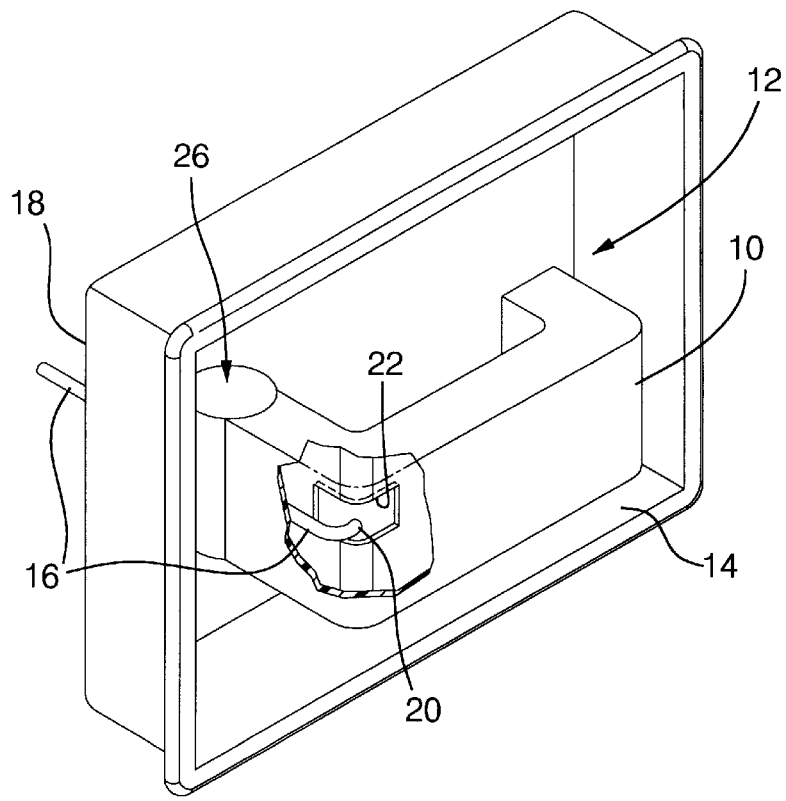
FIG. 1 is a perspective view, with portions broken away, of a fiber optic door handle lighting system according to the present invention.
Figure 2:
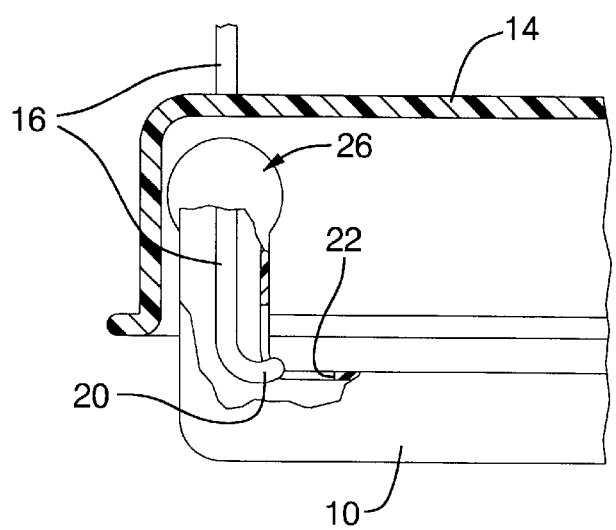
FIG. 2 is a top view of the lighting system in FIG. 1.

Referring now to FIG. 1, the present invention includes a vehicle door having a door handle 10 extending across a door handle well 12 formed in the vehicle door define by a bezel 14. A fiber optic light transmission line 16 extends through the outer panel of the door and through a portion of the handle 10. The transmission line 16 has a termination end positioned in a cut-out 22 formed on the inside face of the handle 10 so that the light source is hidden from a person standing outside the vehicle next to the door and so that the light is directed against and reflects off of the bezel 14. FIG. 2 is a top view of the lighting system of FIG. 1 and showing a handle hinge 26 connecting the handle to the vehicle body.

Figure 3:
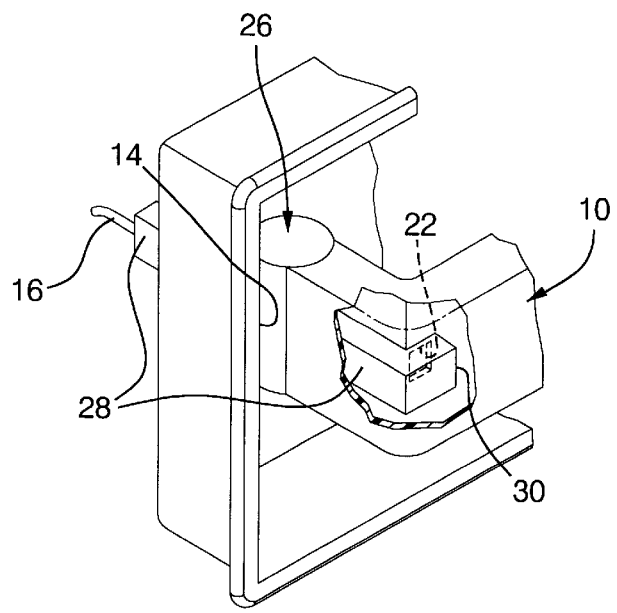
FIG. 3 is a perspective view, with portions broken away, of a fiber optic door handle lighting system utilizing a light pipe according to the present invention.

Referring now to FIG. 3, the present invention may also include a lighting system similar to FIG. 1 but utilizing a light pipe 28 received in the handle 10 and having a termination end 30 position in the cut-out 22 formed in the handle 10.

Figure 4:
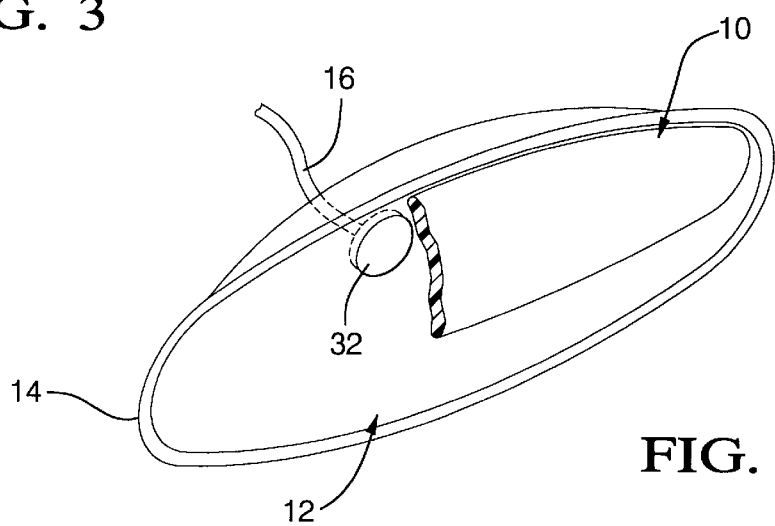
FIG. 4 is a perspective view, with portion broken away, of a fiber optic door handle lighting system having a handle that hides the fiber optic light source positioned in the bezel of the door according to the present invention.
Figure 5:
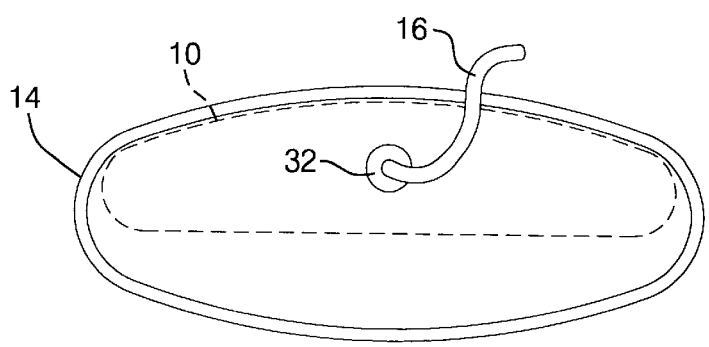
FIG. 5 is a rear view of the lighting system of FIG. 4.
Figure 6:
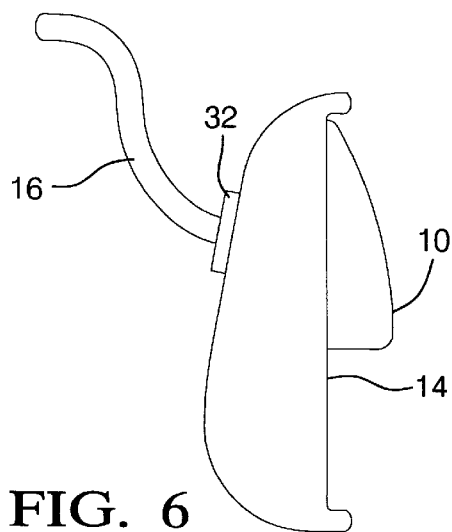
FIG. 6 is a side view of the lighting system of FIG. 4.

Referring now to FIG. 4 the present invention may include a handle 10 extending downward from a top edge of the bezel 14. The fiber optic transmission line 16 extends through the door or bezel 14 at a location behind the handle 10 so that the handle hides the location of the light source from a person standing upright next to the door. A lens 32 may be provided of the termination end of the fiber optic line to protect the line and/or diffuse or color the light as desired. FIGS. 5 and 6 illustrate rear and side views respectively of the lighting system of FIG. 4.

Figure 7:
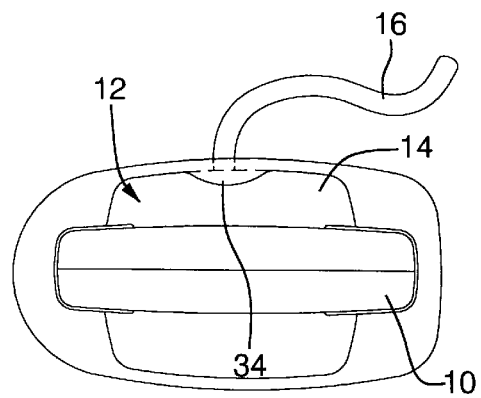
FIG. 7 illustrates a fiber optic light system for an exterior door of a vehicle utilizing an eyebrow structure to hide the light source according to the present invention.
Figure 8:
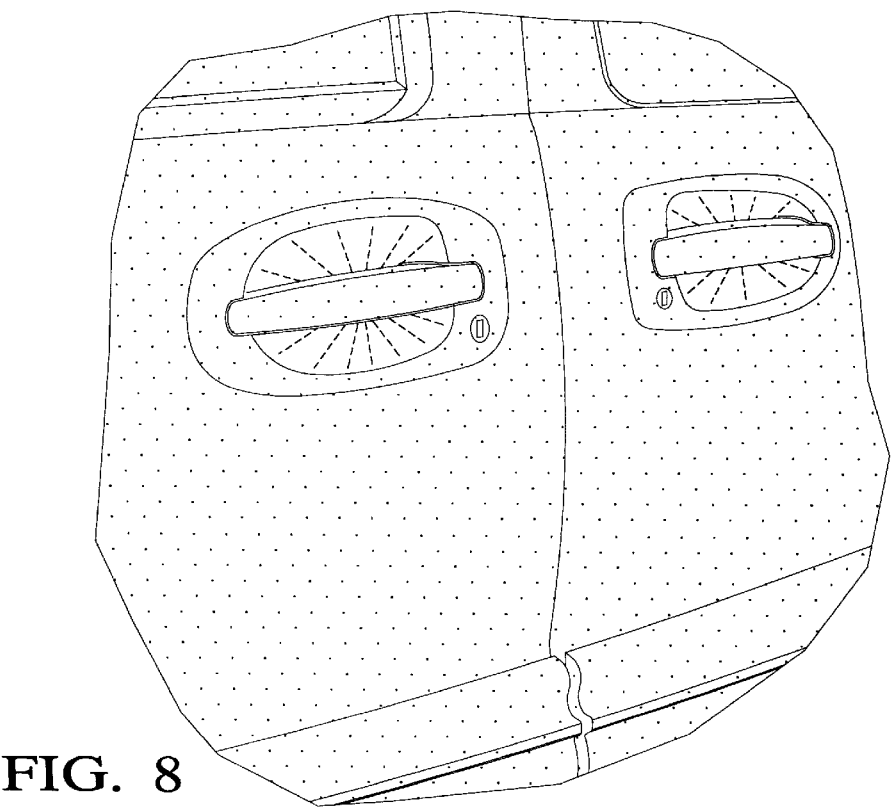
FIG. 8 illustrates a fiber optic door handle lighting system according to the present invention.

FIG. 7 illustrates a fiber optic lighting system for an exterior door handle of a vehicle according to the present invention wherein the door handle 10 extends across at least a portion of the door handle well 12 in generally a horizontal direction so that the upper and lower portion of the bezel is visible. A fiber optic transmission line 16 extends through the door panel and the termination end of the line 16 is located behind an eyebrow 34 that extends downward from the top edge of the bezel and toward the center of the door handle well 12 so that the light source is hidden from a person standing upright next to the door.

The present invention provides a variety of advantages. By reducing the number of bulbs while increasing the number of lighting features, bulb failure is significantly reduced. By using fiber optic lighting system, the cost associated with tooling, piece cost, and mass associated with lamp assemblies is greatly reduced. Further, the use of a fiber optic lighting system reduces the nature of the potential repair effort, the amount of repair time, and the expense usually associated with incandescent lamps. Still further, the termination end fiber optic transmission line 16 is cool to the touch thus allowing the light source to be put in locations in the door handle or bezel not possible with incandescent lamps. Finally, the end of the fiber optic transmission line 16 is extremely small compared to tradition incandescent lamps making the fiber optic light source much more easy to conceal and requiring much less packaging.

I claim:

1. In a vehicle having a door, a door handle for opening the door, and a door handle well formed in the door near the door handle and defined by a bezel behind the door handle; a fiber optic light system including a fiber optic light transmission line having a light emitting end positioned in a cut-out formed on an inside face of the door handle to emit light against the bezel behind the door handle.

2. In a vehicle having a door, a door handle for opening the door, and a door handle well formed in the door near the door handle and defined by a bezel behind the door handle; a fiber optic light system including a fiber optic light transmission line having a light emitting end positioned in a opening formed in the bezel behind the door handle to emit light against a rear surface of the door handle.

3. A system as set forth in claim 2 wherein the handle hides the light emitting end of the fiber optic transmission line from a person standing in an upright position next to the door.

4. In a vehicle having a door, a door handle for opening the door, and a door handle well formed in the door near the door handle and defined by a bezel having a eyebrow; a fiber optic light system including a fiber optic light transmission line having a light emitting end positioned in a opening formed in the bezel behind the eyebrows to emit light against a rear surface of the eyebrow, the eyebrow over hanging the light emitting end to hide the end from a person standing in an upright position next to the door.

5. In the vehicle according to claim 1 wherein the door handle includes a hinge connecting the handle to the vehicle.

6. In the vehicle according to claim 2 wherein a lens is provided at the light emitting end of the fiber optic transmission line.

7. In the vehicle according to claim 3 wherein a lens is provided at the light emitting end of the fiber optic transmission line.

* * * * *